United States Patent
Zhao

(10) Patent No.: US 10,495,913 B2
(45) Date of Patent: Dec. 3, 2019

(54) DISPLAY PANEL, DRIVING METHOD AND MANUFACTURING METHOD THEREOF, DISPLAY DEVICE

(71) Applicant: BOE TECHNOLOGY GROUP CO., LTD., Beijing (CN)

(72) Inventor: Jiayang Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 22 days.

(21) Appl. No.: 15/534,623

(22) PCT Filed: Oct. 21, 2016

(86) PCT No.: PCT/CN2016/102866
§ 371 (c)(1),
(2) Date: Jun. 9, 2017

(87) PCT Pub. No.: WO2017/121161
PCT Pub. Date: Jul. 20, 2017

(65) Prior Publication Data
US 2018/0052350 A1 Feb. 22, 2018

(30) Foreign Application Priority Data
Jan. 15, 2016 (CN) .......................... 2016 1 0025988

(51) Int. Cl.
*G02F 1/1333* (2006.01)
*G02F 1/1343* (2006.01)
*G06F 3/041* (2006.01)

(52) U.S. Cl.
CPC ........ *G02F 1/13338* (2013.01); *G02F 1/1343* (2013.01); *G06F 3/0412* (2013.01); *G06F 3/0414* (2013.01)

(58) Field of Classification Search
None
See application file for complete search history.

(56) References Cited

U.S. PATENT DOCUMENTS

2008/0018613 A1* 1/2008 Kim ...................... G06F 3/0412
345/173
2009/0231304 A1* 9/2009 Lee ...................... G02F 1/13338
345/174

(Continued)

FOREIGN PATENT DOCUMENTS

| CN | 102446043 A | 5/2012 |
| CN | 102483658 A | 5/2012 |

(Continued)

OTHER PUBLICATIONS

Search Report for International Application No. PCT/CN2016/102866 dated Jan. 25, 2017.

(Continued)

*Primary Examiner* — Patrick N Edouard
*Assistant Examiner* — Peijie Shen
(74) *Attorney, Agent, or Firm* — Calfee, Halter & Griswold LLP

(57) ABSTRACT

A display panel including a display area and a non-display area around the display area, and one or more pressure sensors arranged in the non-display area is provided. The pressure sensor is configured to sense a pressure input on the display panel. A display device, a method for driving a display panel, and a method of manufacturing a display panel are also provided.

16 Claims, 4 Drawing Sheets

(56) References Cited

U.S. PATENT DOCUMENTS

| | | | | |
|---|---|---|---|---|
| 2009/0309616 | A1* | 12/2009 | Klinghult | G06F 3/044 324/686 |
| 2010/0277439 | A1* | 11/2010 | Charlier | G06F 1/1616 345/176 |
| 2011/0057899 | A1* | 3/2011 | Sleeman | G01L 1/146 345/174 |
| 2011/0187667 | A1* | 8/2011 | Kaida | G06F 3/0416 345/173 |
| 2011/0193794 | A1* | 8/2011 | Hu | G06F 3/044 345/173 |
| 2011/0242047 | A1 | 10/2011 | Kim et al. | |
| 2012/0068965 | A1* | 3/2012 | Wada | G06F 3/0414 345/174 |
| 2012/0147287 | A1 | 6/2012 | Fujioka | |
| 2012/0182249 | A1* | 7/2012 | Endo | G01L 1/205 345/173 |
| 2013/0002610 | A1 | 1/2013 | Ho et al. | |
| 2013/0021295 | A1* | 1/2013 | Kimura | G02F 1/13338 345/174 |
| 2013/0021544 | A1 | 1/2013 | Fukuyama et al. | |
| 2014/0160073 | A1* | 6/2014 | Matsuki | G06F 3/0485 345/174 |
| 2014/0247239 | A1* | 9/2014 | Jamshidi-Roudbari | G06F 3/0414 345/174 |
| 2014/0253305 | A1* | 9/2014 | Rosenberg | G06F 3/016 340/407.2 |
| 2014/0362045 | A1* | 12/2014 | berg | G06F 3/0488 345/174 |
| 2015/0234220 | A1* | 8/2015 | Hwang | G02F 1/13338 349/12 |
| 2015/0370376 | A1* | 12/2015 | Harley | G06F 3/0414 345/174 |
| 2016/0103544 | A1* | 4/2016 | Filiz | G06F 3/0414 345/174 |
| 2016/0178460 | A1* | 6/2016 | Ogura | G01L 9/0072 73/862.626 |
| 2016/0179229 | A1* | 6/2016 | Ahn | G06F 3/041 345/173 |
| 2016/0357331 | A1* | 12/2016 | Kano | G06F 3/044 |
| 2016/0364057 | A1* | 12/2016 | Chi | G06F 3/0414 |
| 2017/0031504 | A1* | 2/2017 | Hwang | G06F 3/0488 |
| 2017/0060340 | A1* | 3/2017 | Chen | G06F 3/0412 |
| 2017/0068368 | A1* | 3/2017 | Hsiao | G06F 3/0416 |
| 2017/0083147 | A1* | 3/2017 | Su | G06F 3/0416 |
| 2017/0168621 | A1* | 6/2017 | Jo | G06F 3/0412 |
| 2017/0177125 | A1* | 6/2017 | Kim | G06F 3/0412 |
| 2017/0192582 | A1* | 7/2017 | Pan | G06F 3/0416 |
| 2017/0235414 | A1 | 8/2017 | Ding et al. | |
| 2017/0269756 | A1 | 9/2017 | Wang et al. | |
| 2017/0277326 | A1* | 9/2017 | Cao | H01L 27/1214 |
| 2017/0284883 | A1* | 10/2017 | Yang | G01L 9/0072 |
| 2017/0357346 | A1* | 12/2017 | Wang | G06F 3/044 |

FOREIGN PATENT DOCUMENTS

| | | |
|---|---|---|
| CN | 102822777 A | 12/2012 |
| CN | 103823592 A | 5/2014 |
| CN | 104423748 A | 3/2015 |
| CN | 104866147 A | 8/2015 |
| CN | 105068695 A | 11/2015 |
| CN | 105136378 A | 12/2015 |
| CN | 105183257 A | 12/2015 |
| CN | 105487273 A | 4/2016 |
| EP | 2372506 A1 | 10/2011 |
| JP | 2011170659 A | 9/2011 |

OTHER PUBLICATIONS

First Office Action for Chinese Patent Application No. 201610025988.6 dated Aug. 19, 2016.
Second Office Action for Chinese Patent Application No. 201610025988.6 dated Jan. 25, 2017.
Text of the Decision on Rejection for Chinese Patent Application No. 201610025988.6 dated Apr. 21, 2017.
Search Report for Chinese Patent Application No. 20161025988.6 dated May 15, 2016.
Notice of Reexamination for Chinese Patent Application No. 201610025988.6 dated May 7, 2018.
Search Report for European Patent Application No. 16869378.6 dated Jul. 3, 2019.

* cited by examiner

DISPLAY PANEL, DRIVING METHOD AND MANUFACTURING METHOD THEREOF, DISPLAY DEVICE

RELATED APPLICATION

The present application is the U.S. national phase entry of PCT/CN2016/102866, with an international filing date of Oct. 21, 2016, which claims the benefit of Chinese Patent Application No. 201610025988.6, filed on Jan. 15, 2016, the entire disclosure of which is incorporated herein by reference.

FIELD

The present disclosure generally relates to the field of display technology, and specifically to a display panel, a display device including the display panel, a method for driving the display panel, and a method for manufacturing the display panel.

BACKGROUND

In the prior art, a touch sensor panel is coupled to an actuator to form a push button that can generate an input based on the press on the button and/or based on a touch event performed on the button surface. The presence of the push button will extend the touch screen's sensing of the user input from the traditional two-dimensional space to a three-dimensional space, that is, the touch screen can not only sense the user's touch input on the plane of the touch screen, but also sense the user's one-level or even multi-level press input in the direction perpendicular to the touch screen, which greatly enhances the user's experience of interaction with the touch screen and enriches the function of the touch screen.

However, in the prior art, the actuator is typically coupled as a separate module to the touch sensor panel, resulting in an increase in the size of the resulting touch screen, which is contrary to the current technology development trend of lightening, thinning and portability.

In view of the above, there is a need for an improved inductive display device in the display field.

SUMMARY

It is an objective of the present disclosure to provide a display panel, a display device including the display panel, a method for driving the display panel, and a method for manufacturing the display panel, which can at least partially alleviate or eliminate one or more of the problems in the prior art as mentioned above.

According to an aspect of the present disclosure, there is provided a display panel that may comprise a display area and a non-display area around the display area, and one or more pressure sensors arranged in the non-display area, wherein the pressure sensors are configured to sense a pressure input on the display panel.

In the present disclosure, by integrating one or more pressure sensors in the display panel, sensing of the pressure on the display panel can be realized without increasing the size of the display panel, thereby facilitating lightening, thinning and portability of the display panel.

As used herein, the term "pressure sensor" may refer to any type of pressure sensor as known to those skilled in the art, such as resistance strain-type pressure sensors, semiconductor strain-type pressure sensors, piezoresistive pressure sensors, inductive pressure sensors, capacitance strain-type pressure sensors, resonant pressure sensors, capacitive acceleration sensors, and so on.

According to an embodiment of the present disclosure, the pressure sensor may comprise a first electrode arranged on an opposite substrate of the display panel and a second electrode arranged on an array substrate of the display panel which are disposed opposite to each other, and an elastic material layer sandwiched between the first electrode and the second electrode.

In this embodiment, a capacitance strain-type pressure sensor is used to sense the pressure input on the display panel. Specifically, according to the elastic properties of the elastic material and the strain-type capacitance variation principle, when the display panel is applied with a pressure, the display panel is slightly deformed, which results in a change in the height of the elastic material (for example, being compressed) so that the capacitance value between the first electrode and the second electrode of the pressure sensor is changed. Moreover, different capacitance variation levels correspond to the applied pressure levels, thus sensing of the pressure input is enabled.

According to an embodiment of the present disclosure, in the display area, the opposite substrate may comprise a common electrode on a side close to the array substrate, and the first electrode and the common electrode may be set to be in the same layer and have the same material. The first electrode and the common electrode may be formed in one patterning process, thereby simplifying the process flow and saving the manufacturing cost.

According to an embodiment of the present disclosure, in the display area, the array substrate may comprise an electrode layer on a side close to the opposite substrate, and the second electrode and the electrode layer may be set to be in the same layer and have the same material. The second electrode and the electrode layer may be formed in one patterning process, thereby simplifying the process flow and saving the manufacturing cost.

In an exemplary embodiment, the electrode layer may include one of a gate electrode layer, a source/drain electrode layer, and a pixel electrode layer.

According to another embodiment of the present disclosure, the display panel may further comprise a spacer arranged between the array substrate and the opposite substrate for supporting the array substrate and the opposite substrate, wherein the elastic material layer and the spacer of the display panel may be set to be in the same layer and have the same material. Likewise, the elastic material layer and the spacer may be formed in one patterning process, thereby simplifying the process flow and saving manufacturing costs.

As used herein, the term "spacer" refers to an auxiliary material used during assembly of a display panel for controlling the gap between the opposite substrate and the array substrate of the display panel to maintain an optimum layer thickness.

According to a further embodiment of the present disclosure, the pressure sensor may further comprise a pressure sensor control circuit. The first electrode and the second electrode may be connected to the pressure sensor control circuit via a corresponding signal line, respectively.

According to yet another embodiment of the present disclosure, the display panel may comprise an integrated control circuit. The pressure sensor control circuit may be integrated with a driving circuit of the display panel on the integrated control circuit.

As known to those skilled in the art, the driving circuit of the display panel may include a power supply sub-circuit, a timing control sub-circuit, a grayscale sub-circuit, a data driving sub-circuit, a gate driving sub-circuit, a system interface, and so on. The signals from the system provide various display data and timing control signals to the driving circuit via a system interface. Part of these data and signals are transmitted to the timing control sub-circuit, thereby generating an operating timing for the data driving sub-circuit and the gate driving sub-circuit. In an exemplary embodiment of the present disclosure, the pressure sensor control circuit may be integrated integrally with the driving circuit of the display panel or may be integrated with one or more sub-circuits of the driving circuit.

According to another aspect of the present disclosure, there is provided a display device that may comprise a display panel as described in any of the foregoing embodiments.

In the present disclosure, by integrating one or more pressure sensors in the display panel of the display device, pressure sensing can be realized without increasing the size of the display device, thereby facilitating lightening, thinning and portability of the display device.

According to an embodiment of the present disclosure, the above display device may further comprise a touch panel disposed on a light exit side of the display panel.

According to a further aspect of the present disclosure, there is provided a method for driving a display panel. The method is suitable for driving a display panel as described in any of the foregoing embodiments. The driving method may comprise sensing a pressure input on the display panel using one or more pressure sensors integrated in a non-display area of the display panel in a pressure sensing phase; and displaying an image in a display phase.

According to an embodiment of the present disclosure, the pressure sensing phase and the display phase are alternate and do not overlap. In the above-described driving method, the second electrode of each pressure sensor is subjected to pulse scanning line by line. Both of the pressure sensing and the display function are achieved in a time-division multiplexing manner, for example, the pressure sensing is performed in a clock synchronization phase of each frame. Therefore, the interference of internal signals of the display panel is avoided.

In addition, the above driving method of the display panel has embodiments and advantages corresponding or similar to those of the display panel according to the first aspect of the present disclosure and the display device according to the second aspect of the present disclosure, which will not be described here for simplicity.

According to yet another aspect of the present disclosure, there is provided a method of manufacturing a display panel. The method is suitable for manufacturing a display panel as described in any of the foregoing embodiments. The manufacturing method may comprise manufacturing an array substrate and an opposite substrate; aligning and attaching the array substrate and the opposite substrate to form a display panel; and manufacturing a pressor sensor between the array substrate and the opposite substrate, the pressure sensor comprising a first electrode arranged on the opposite substrate and a second electrode arranged on the array substrate which are disposed opposite to each other, and an elastic material layer sandwiched between the first electrode and the second electrode.

According to an embodiment of the present disclosure, in the display area, the opposite substrate may comprise a common electrode on a side close to the array substrate, and the method may further comprise forming the first electrode and the common electrode by one patterning process.

According to another embodiment of the present disclosure, in the display area, the array substrate may comprise an electrode layer on a side close to the opposite substrate, and the method may further comprise forming the second electrode and the electrode layer by one patterning process.

According to a further embodiment of the present disclosure, the display panel may further comprise a spacer arranged in the display area for supporting the array substrate and the opposite substrate, wherein the method may further comprise forming the elastic material layer of the pressure sensor and the spacer of the display panel by one patterning process.

In addition, the above manufacturing method of the display panel has embodiments and advantages corresponding or similar to those of the display panel according to the first aspect of the present disclosure and the display device according to the second aspect of the present disclosure, which will not be described here for simplicity.

BRIEF DESCRIPTION OF DRAWINGS

These and other aspects of the present disclosure will now be described in more detail with reference to the accompanying drawings which illustrate embodiments of the present disclosure, wherein the drawings are not necessarily drawn to scale, but focus on illustrating the principles of the present disclosure. In the drawings.

DETAILED DESCRIPTION

The present disclosure will now be described more comprehensively below with reference to the accompanying drawings, in which embodiments of the present disclosure are illustrated. However, the present disclosure may be embodied in many different forms and should not be construed as being limited to the embodiments set forth herein; rather, these embodiments are provided for completeness and thoroughness and for the purpose of providing those skilled in the art with a comprehensive view of the scope of the present disclosure.

Figure 1:
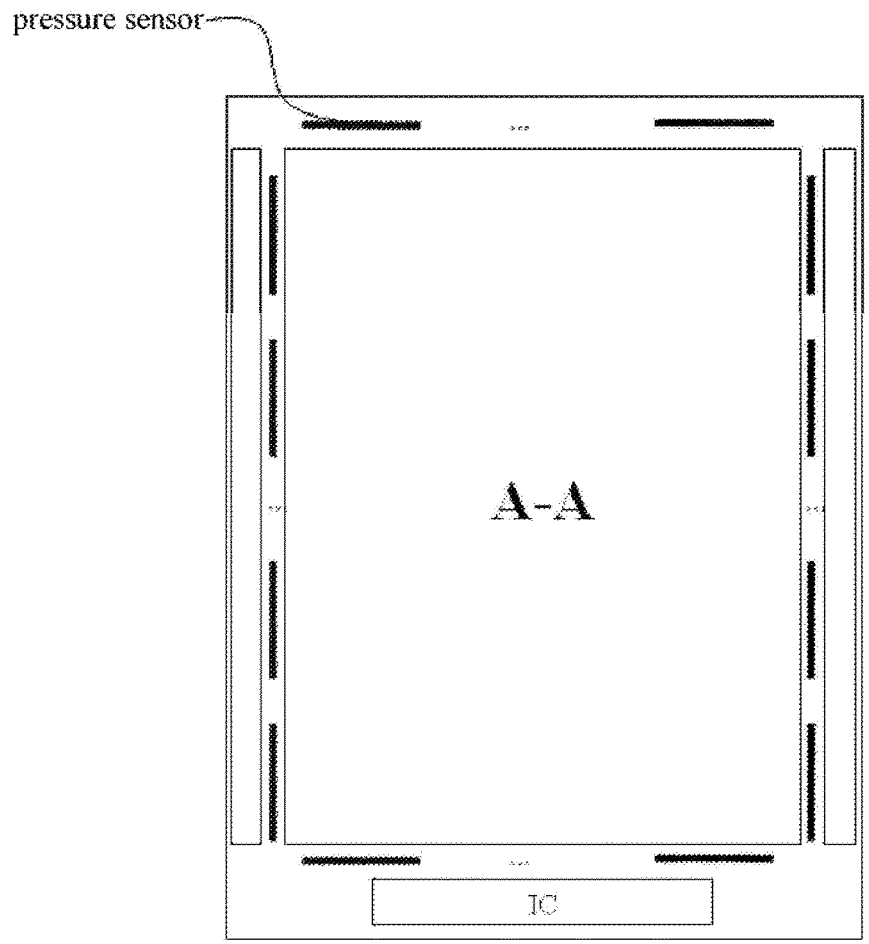
FIG. 1 schematically illustrates a top view of a display panel according to embodiments of the present disclosure.

FIG. 1 schematically illustrates a top view of a display panel according to embodiments of the present disclosure. As shown in FIG. 1, the display panel comprises a display area A-A and a non-display area around the display area A-A, and one or more pressure sensors arranged in the non-display area, wherein the pressure sensors are configured to sense a pressure input on the display panel.

Figure 2:
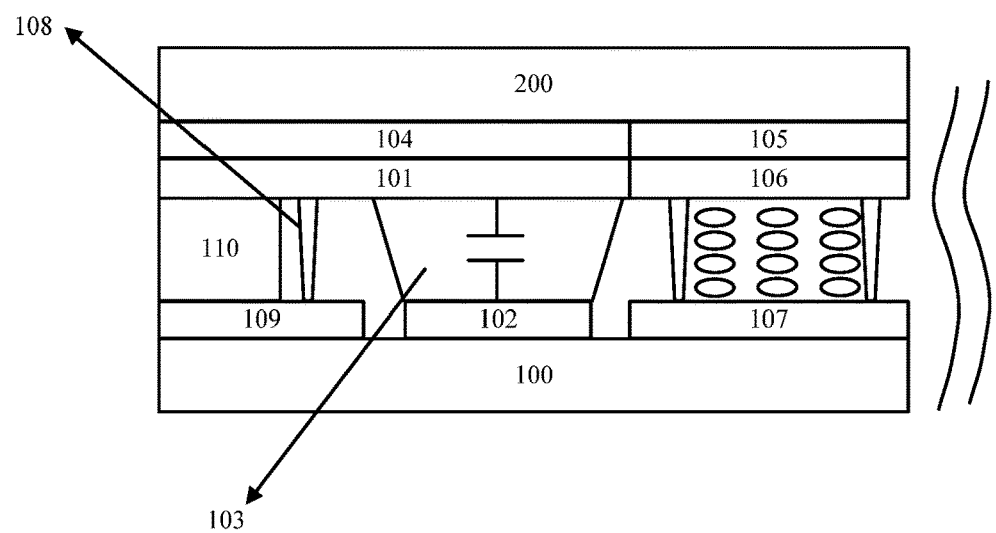
FIG. 2 schematically illustrates a sectional view of a display panel according to an embodiment of the present disclosure.
Figure 3:
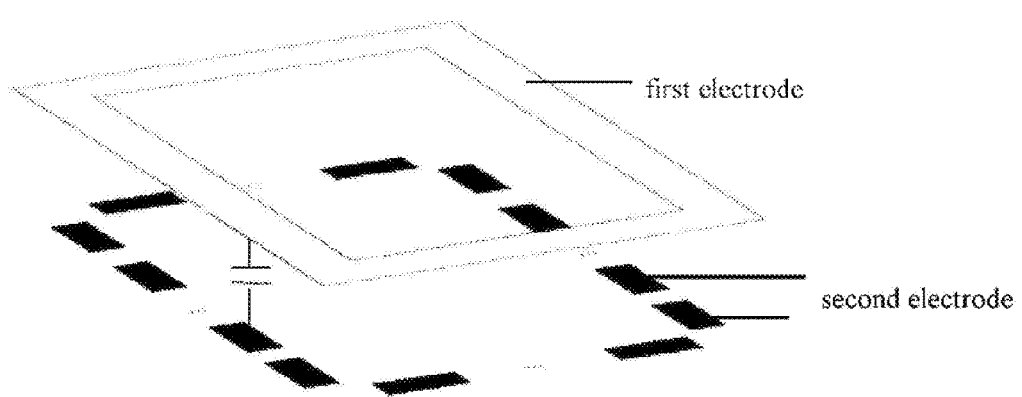
FIG. 3 illustrates a simplified schematic view of a pressure sensor according to embodiments of the present disclosure.

FIG. 2 schematically illustrates a sectional view of a display panel according to embodiments of the present disclosure. As shown in FIG. 2, the pressure sensor may comprise a first electrode 101 arranged on an opposite substrate 200 of the display panel and a second electrode 102 arranged on an array substrate 100 of the display panel which are disposed opposite to each other, and an elastic material layer 103 sandwiched between the first electrode 101 and the second electrode 102. As shown in FIG. 2, the pressure sensor is located below a black matrix 104 of the display panel. The first electrode 101, the second electrode 102, and the elastic material layer 103 therebetween constitute a capacitance strain-type pressure sensor. Each pressure sensor comprises a separate second electrode, and a plurality of pressure sensors share one first electrode, as shown in FIG. 3. In FIG. 3, the elastic material layer of the pressure sensors is omitted for clarity.

Figure 4:
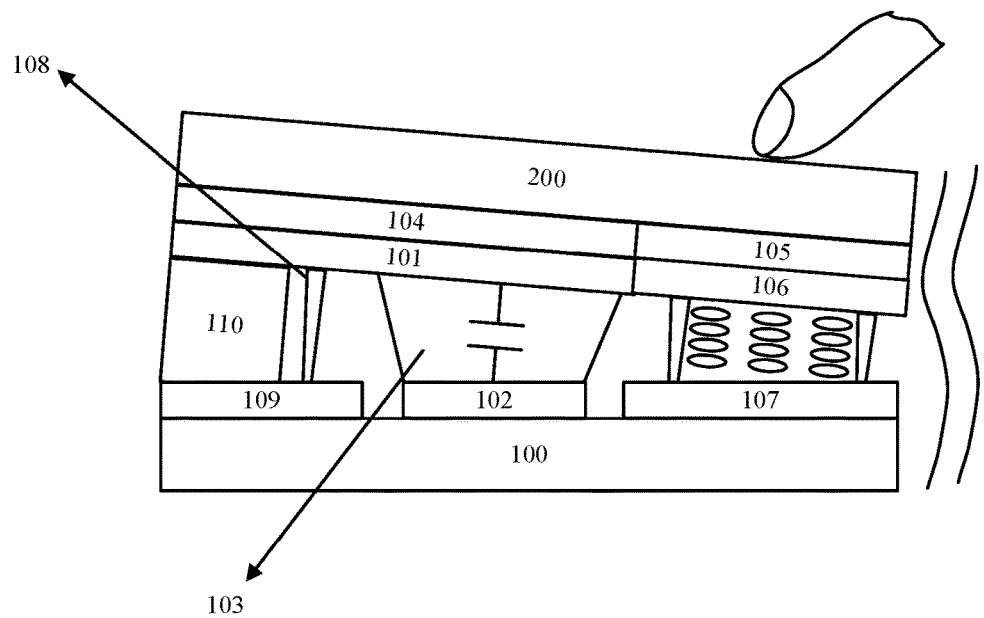
FIG. 4 schematically illustrates a sectional view of a display panel according to embodiments of the present disclosure when applied with a force.

When a finger applies a pressure on the display panel, as shown in FIG. 4, the display panel is slightly deformed, such that the elastic material layer 103 is compressed, thereby changing the capacitance value between the first electrode 101 and the second electrode 102. Moreover, different capacitance variation levels correspond to the applied pressure levels, thus sensing of the pressure input is enabled.

It is to be noted that, although only one pressure sensor is shown schematically in FIGS. 2 and 4, the display panel may include any one or more pressure sensors (as shown in FIG. 3) based on the factors such as size design, desired pressure sensing accuracy, and so on. Moreover, the pressure sensor is not limited to a capacitance strain-type pressure sensor, but any type of pressure sensor known in the art may be used.

Optionally, as shown in FIG. 2, in the display area, the opposite substrate 200 comprises a color film layer 105 and a common electrode 106 on a side close to the array substrate 100, and the first electrode 101 and the common electrode 106 are formed of the same material in the same layer. For example, the first electrode and the common electrode are formed in one patterning process, thereby simplifying the process flow and saving the manufacturing cost. In the display area, the array substrate 100 comprises an electrode layer 107 on a side close to the opposite substrate 200, and the second electrode 102 and the electrode layer 107 are formed of the same material in the same layer. For example, the second electrode and the electrode layer are formed in one patterning process, thereby simplifying the process flow and saving the manufacturing cost. The electrode layer 107 may include one of a gate electrode layer, a source/drain electrode layer, and a pixel electrode layer.

In one example, the display panel further comprises a spacer 108 between the array substrate 100 and the opposite substrate 200 for supporting the array substrate 100 and the opposite substrate 200, wherein the elastic material layer 103 and the spacer 108 of the display panel are formed of the same material in the same layer. Likewise, the elastic material layer and the spacer are formed in one patterning process, thereby simplifying the process flow and saving the manufacturing cost. The elastic material layer and the spacer may be formed simultaneously by patterning processes known in the art such as sputtering, photolithography, etch stripping, and so on. In addition, the display panel further comprises an array drive stack 109 and a sealant 110 located in the non-display area, wherein the array drive stack 109 is used to drive individual pixels of the display panel and the sealant 110 is used to package the display panel.

Each of the pressure sensors comprises a pressure sensor control circuit (not shown), and the first electrode and the second electrode are connected to the pressure sensor control circuit via a corresponding signal line, respectively. The pressure sensor control circuit is configured to drive the pressure sensor in a pressure sensing phase and receive a sensing signal of the pressure sensor to determine the user's press input based on the received sensing signal. In practice, the pressure sensor control circuit may be integrated with a driving circuit of the display panel on an integrated control circuit of the display panel, or may be an external circuit of the integrated control circuit of the display panel.

Figure 5:
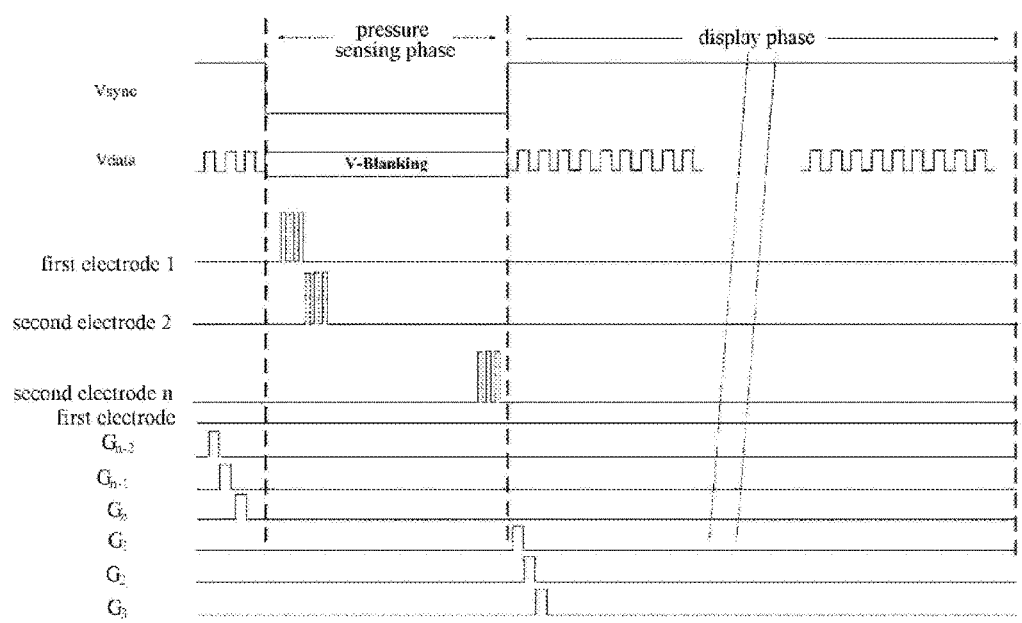
FIG. 5 schematically illustrates a method for driving a display panel according to embodiments of the present disclosure.

FIG. 5 schematically illustrates a method for driving the display panel described above. As shown in FIG. 5, in a pressure sensing phase, a pressure input on the display panel is sensed by detecting signals on the respective second electrodes 1 to n of a plurality of pressure sensors, and the first electrodes of the plurality of pressure sensors are grounded. In a display phase, a gate driving signal is applied to gate lines G1, G2, . . . , Gn−2, Gn−1, Gn successively and the display panel displays an image. At that time, the respective second electrodes 1 to n and the first electrodes of the plurality of pressure sensors do not output signals. It can be seen from FIG. 5 that the pressure sensing phase and the display phase are alternate and do not overlap.

Figure 6:
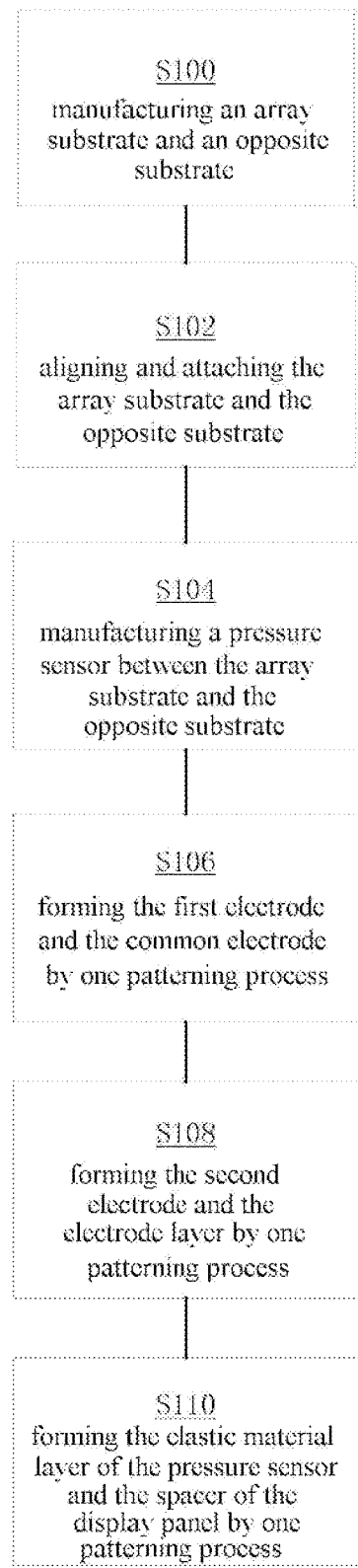
FIG. 6 schematically illustrates a flow chart of a method of manufacturing a display panel according to embodiments of the present disclosure.

FIG. 6 schematically illustrates a flow chart of a method of manufacturing a display panel according to embodiments of the present disclosure. As shown in FIG. 6, at step S100, an array substrate and an opposite substrate are manufactured. At step S102, the array substrate is aligned with and attached to the opposite substrate to form a display panel. At step S104, a pressure sensor between the array substrate and the opposite substrate is made, which comprises a first electrode arranged on the opposite substrate and a second electrode arranged on the array substrate which are disposed opposite to each other, and an elastic material layer sandwiched between the first electrode and the second electrode.

Optionally, the above method may further comprise the following steps. In the case that the opposite substrate comprises a common electrode on a side close to the array substrate, the method further comprises forming the first electrode and the common electrode by one patterning process at step S106. In the case that the array substrate comprises an electrode layer on a side close to opposite substrate, the method further comprises forming the second electrode and the electrode layer by one patterning process at step S108. In addition, in the case that the display panel further comprises a spacer, the method further comprises forming the elastic material layer of the pressure sensor and the spacer of the display panel by one patterning process at step S110.

The present disclosure further provides a display device comprising the display panel described above, which may optionally comprise a touch panel disposed on a light exit side of the display panel.

The present disclosure can be widely applied to various display devices and apparatuses having a display device such as a mobile phone, a notebook computer, a television set, and the like.

It is to be understood that, in any method including more than one step or action as claimed herein, the order of steps or actions of the method is not necessarily limited to the order of reciting the steps or actions of the method, unless clearly indicated to the contrary, and some of the steps may be omitted from the method or the order in which the steps of the method are performed may be changed. For example, in FIG. 6, steps S106, S108 and S110 may be omitted without departing from the scope of the present invention.

Those skilled in the art will recognize that the present disclosure is by no means limited to the example embodiments described above. Rather, many modifications and variations are possible within the scope of the appended claims. For example, other components may be added to the described device or removed from the described device. Other embodiments may be within the scope of the present disclosure. Furthermore, in the claims, the word "comprises" or "comprising" does not exclude other elements or steps. The mere fact that certain measures are recited in mutually different dependent claims does not indicate that a combination of these measures cannot be used to advantage.

The invention claimed is:

1. A display panel comprising a display area, a non-display area around the display area, wherein the display panel comprises
   an array substrate;
   an opposite substrate opposite to the array substrate;
   a display area array stack between the array substrate and the opposite substrate and in the display area;
   an array driving stack between the array substrate and the opposite substrate and in the non-display area;
   one or more pressure sensors between the array substrate and the opposite substrate, in the non-display area, and between the display area array stack and the array driving stack; and
   a spacer between the array substrate and the opposite substrate for supporting the array substrate and the opposite substrate,
   wherein
   the pressure sensors are configured to sense a pressure input on the display panel,
   each pressure sensor comprises a first electrode arranged on the opposite substrate, a second electrode arranged on the array substrate, and an elastic material layer sandwiched between the first electrode and the second electrode,
   the spacer being disposed between the first electrode and the array driving stack, and
   the elastic material layer and the spacer are set to be in a same layer, have a same material and a same height.

2. The display panel according to claim 1, wherein in the display area, the opposite substrate comprises a common electrode on a side close to the array substrate, the first electrode and the common electrode being set to be in a same layer and have a same material.

3. The display panel according to claim 1, wherein in the display area, the array substrate comprises an electrode layer on a side close to the opposite substrate, the second electrode and the electrode layer being set to be in a same layer and have a same material.

4. The display panel according to claim 3, wherein the electrode layer comprises one of a gate electrode layer, a source/drain electrode layer, and a pixel electrode layer.

5. The display panel according to claim 1, wherein the pressure sensor further comprises a pressure sensor control circuit, wherein the first electrode and the second electrode are connected to the pressure sensor control circuit via a corresponding signal line.

6. The display panel according to claim 5, wherein the display panel comprises an integrated control circuit, the pressure sensor control circuit and a control circuit of the display panel are integrated on the integrated control circuit.

7. A display device comprising the display panel according to claim 1.

8. The display device according to claim 7, further comprising a touch panel disposed on a light exit side of the display panel.

9. A method for driving a display panel comprising:
   providing the display panel, comprising
   providing an array substrate;
   providing an opposite substrate opposite to the array substrate;
   providing a display area array stack between the array substrate and the opposite substrate and in the display area;
   providing an array driving stack between the array substrate and the opposite substrate and in the non-display area;
   providing one or more pressure sensors between the array substrate and the opposite substrate, in the non-display area, and between the display area array stack and the array driving stack, to sense a pressure input on the display panel; and
   providing a spacer between the array substrate and the opposite substrate for supporting the array substrate and the opposite substrate,
   in a pressure sensing phase, sensing a pressure input on the display panel using the one or more pressure sensors integrated in the non-display area of the display panel; and
   in a display phase, displaying an image,
   wherein
   each pressure sensor comprises a first electrode arranged on the opposite substrate, a second electrode arranged on the array substrate, and an elastic material layer sandwiched between the first electrode and the second electrode,
   the spacer being disposed between the first electrode and the array driving stack, and
   the elastic material layer and the spacer are set to be in a same layer, have a same material and a same height.

10. The method according to claim 9, wherein the pressure sensing phase and the display phase are alternate and do not overlap.

11. A method of manufacturing a display panel, the display panel comprising a display area and a non-display area around the display area, the method comprising:
    providing an array substrate;
    providing an opposite substrate opposite to the array substrate;
    aligning and attaching the array substrate and the opposite substrate;
    providing a display area array stack between the array substrate and the opposite substrate and in the display area;
    providing an array driving stack between the array substrate and the opposite substrate and in the non-display area;
    providing one or more pressure sensors between the array substrate and the opposite substrate, in the non-display area, and between the display area array stack and the array driving stack, to sense a pressure input on the display panel; and
    providing a spacer between the array substrate and the opposite substrate for supporting the array substrate and the opposite substrate, wherein said providing one or more pressure sensors comprises providing a first electrode on the opposite substrate;

providing a second electrode on the array substrate; and providing an elastic material layer between the first electrode and the second electrode, wherein the elastic material layer and the spacer are formed by one patterning process and have a same height and wherein the spacer is disposed between the first electrode and the array driving stack.

12. The method according to claim 11, wherein in the display area, the opposite substrate comprises a common electrode on a side close to the array substrate, the method further comprising forming the first electrode and the common electrode by one patterning process.

13. The method according to claim 11, wherein in the display area, the array substrate comprises an electrode layer on a side close to the opposite substrate, the method further comprising forming the second electrode and the electrode layer by one patterning process.

14. The display device according to claim 7, wherein in the display area, the opposite substrate comprises a common electrode on a side close to the array substrate, the first electrode and the common electrode being set to be in a same layer and have a same material.

15. The display device according to claim 7, wherein in the display area, the array substrate comprises an electrode layer on a side close to the opposite substrate, the second electrode and the electrode layer being set to be in a same layer and have a same material.

16. The display device according to claim 15, wherein the electrode layer comprises one of a gate electrode layer, a source/drain electrode layer, and a pixel electrode layer.

* * * * *